May 15, 1951 G. T. BAKER 2,552,760

BINARY CALCULATOR

Filed April 12, 1946 5 Sheets-Sheet 1

INVENTOR
GEORGE THOMAS BAKER

BY

ATTORNEY

INVENTOR
GEORGE THOMAS BAKER
BY Chas. L. Candy
ATTORNEY

May 15, 1951 G. T. BAKER 2,552,760

BINARY CALCULATOR

Filed April 12, 1946 5 Sheets-Sheet 3

| | |
|---|---|
| 0 | – |
| 1 | W |
| 2 | X |
| 3 | WX |
| 4 | Y |
| 5 | WY |
| 6 | XY |
| 7 | WXY |
| 8 | Z |
| 9 | WZ |

INVENTOR
GEORGE THOMAS BAKER

BY Chas. W. Candy

ATTORNEY

May 15, 1951 G. T. BAKER 2,552,760

BINARY CALCULATOR

Filed April 12, 1946 5 Sheets-Sheet 4

INVENTOR
GEORGE THOMAS BAKER

BY [signature]

ATTORNEY

May 15, 1951 G. T. BAKER 2,552,760

BINARY CALCULATOR

Filed April 12, 1946 5 Sheets-Sheet 5

*INVENTOR.*
GEORGE THOMAS BAKER

BY [signature]

ATTORNEY

Patented May 15, 1951 2,552,760

UNITED STATES PATENT OFFICE 2,552,760

BINARY CALCULATOR

George Thomas Baker, Liverpool, England, assignor to Automatic Electric Laboratories Inc., Chicago, Ill., a corporation of Delaware Application April 12, 1946, Serial No. 661,590
In Great Britain May 2, 1945

19 Claims. (Cl. 235—61)

Figure 1:
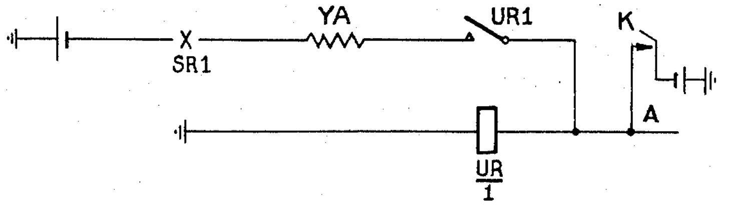

The present invention relates to electrically-operated calculating equipment and is more particularly concerned with the production of apparatus capable of performing a variety of forms of computation which shall make use of electromagnetic relays and stepping switches of the rotary type as commonly used in automatic telephone systems. The chief object of the invention is to produce a machine suitable for performing the operations of simple arithmetic rapidly and reliably while at the same time the machine occupies a comparatively small bulk and is not unduly costly.

It has been found that the operation of a calculating machine of the type contemplated is simplified by the use of the binary scale to and from which the numbers concerned may be converted automatically or by the operator. It will be appreciated that with the use of this scale the only digits which come in question are 0 and 1, that is to say, there are only two possibilities and consequently any number expressed in the binary scale may be readily represented physically by a group of simple relays in accordance with which of the two positions, operated or non-operated, they occupy. On this basis it is possible for each digit to be represented by a single relay though it is not outside the scope of the invention to make use of other scales in which however either special forms of relay or a plurality of relays are necessary for each digit. The number required need not however be anything like as great as the radix of the scale since the relays may be operated in various combinations and four will in fact more than suffice to express any digit on the ordinary decimal scale.

According to one feature of the invention, in a counting or computing arrangement employing a rotary stepping switch, the wipers of the switch are adapted by their movement to connect with a group of storage relays and to transfer the setting of the storage relays to a group of common relays which thereupon control the setting of the storage relays to a different value.

According to another feature of the invention, in an arrangement for effecting computation electrically a number on which an operation is to take place is registered on groups comprising one or more relays connected to adjacent contacts in the bank of a rotary switch, the movement of the switch in passing over the group causing the setting of the relays to control a group of common relays over the switch wipers the common relays then serving to control the setting of the first relay group in dependence on the setting of further groups of relays similarly connected to another bank of the switch.

A further feature of the invention is that in an arrangement for effecting addition or subtraction electrically, the first number is registered in the binary scale on a group of relays connected to successive contacts in the bank of a rotary switch while the second number is similarly registered on another group of relays connected to successive contacts in a second bank of the switch, the registrations in each position of the switch being transferred as the wipers advance to common relays which thereupon control the registering relays in such manner that the corresponding relay of the first group then registers the appropriate digit of the required sum or difference while the corresponding relay of the second group is released to give zero registration on said group.

Still another feature of the invention is that in an arrangement for effecting multiplication electrically by the operation of two rotary stepping switches the two numbers concerned are registered in the binary scale on groups of relays connected to successive contacts in the banks of the respective switches and the switches are then adapted to be operated through a cycle for each digit registered on the relays associated with the first switch the wipers of the two switches engaging corresponding digit positions simultaneously on the first cycle and being thereafter displaced one step corresponding to each succeeding cycle the switches having associated with them common equipment which is operated dependent upon the registrations encountered by the wipers of the two switches at any position and thereupon effects suitable alteration of the registrations so that on the completion of the operation the registration associated with the first switch represents the desired product while that associated with the second switch is zero.

Figure 2:
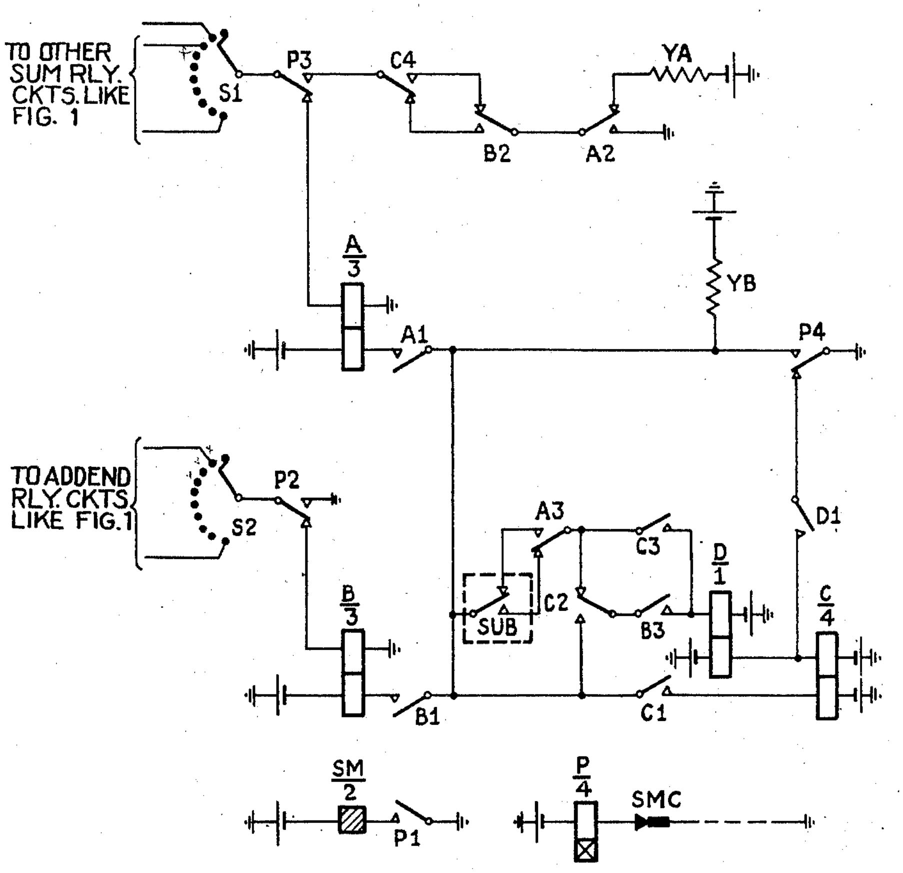
Figure 3:
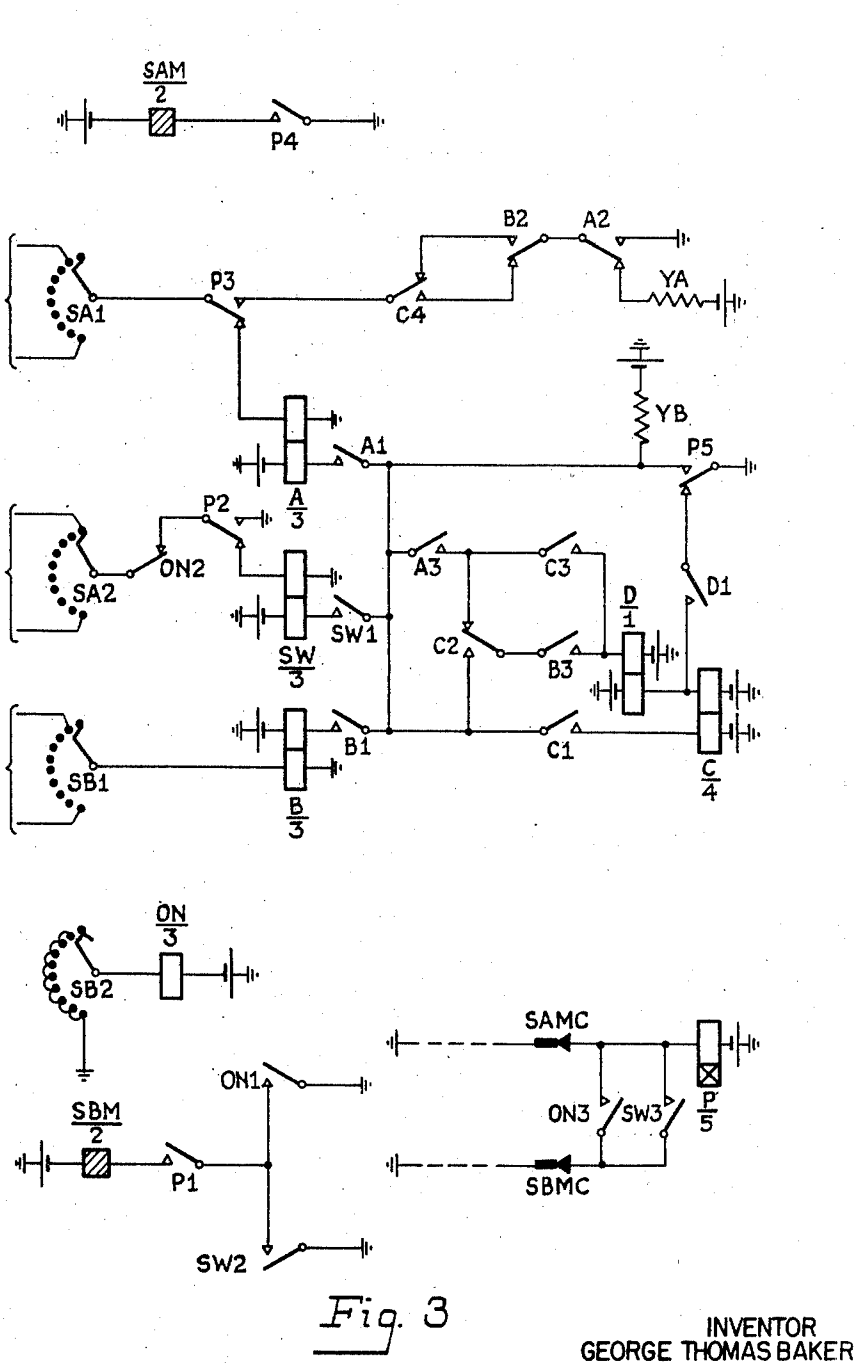
Figures 4, 6:
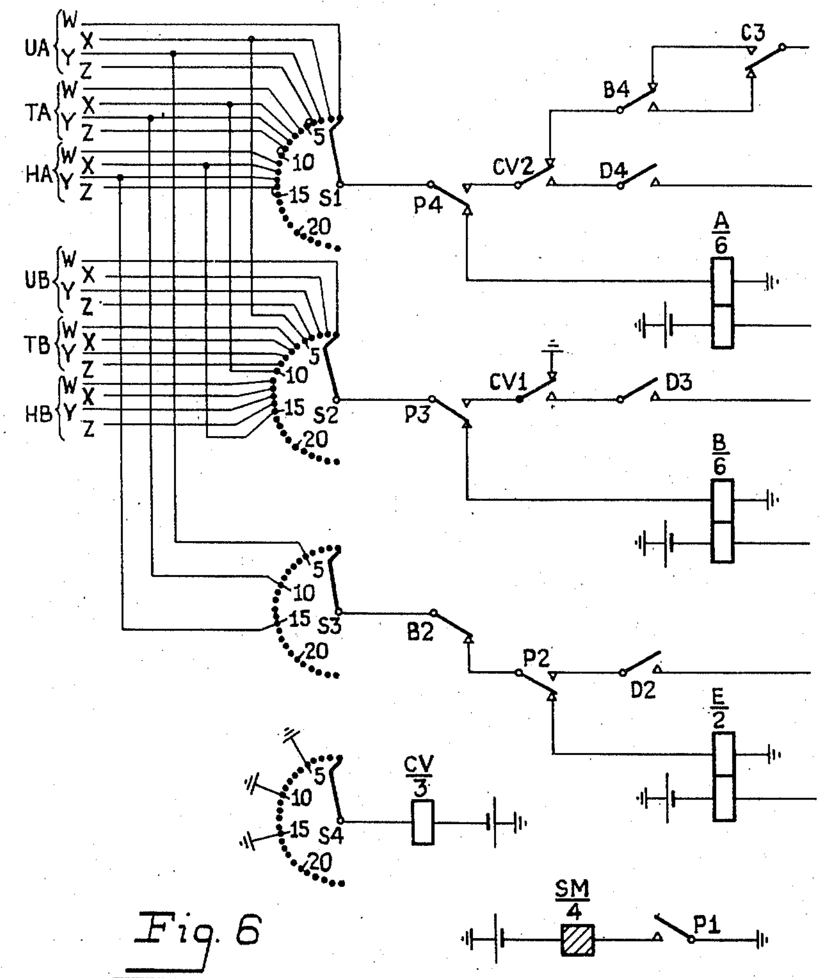
Figure 5:
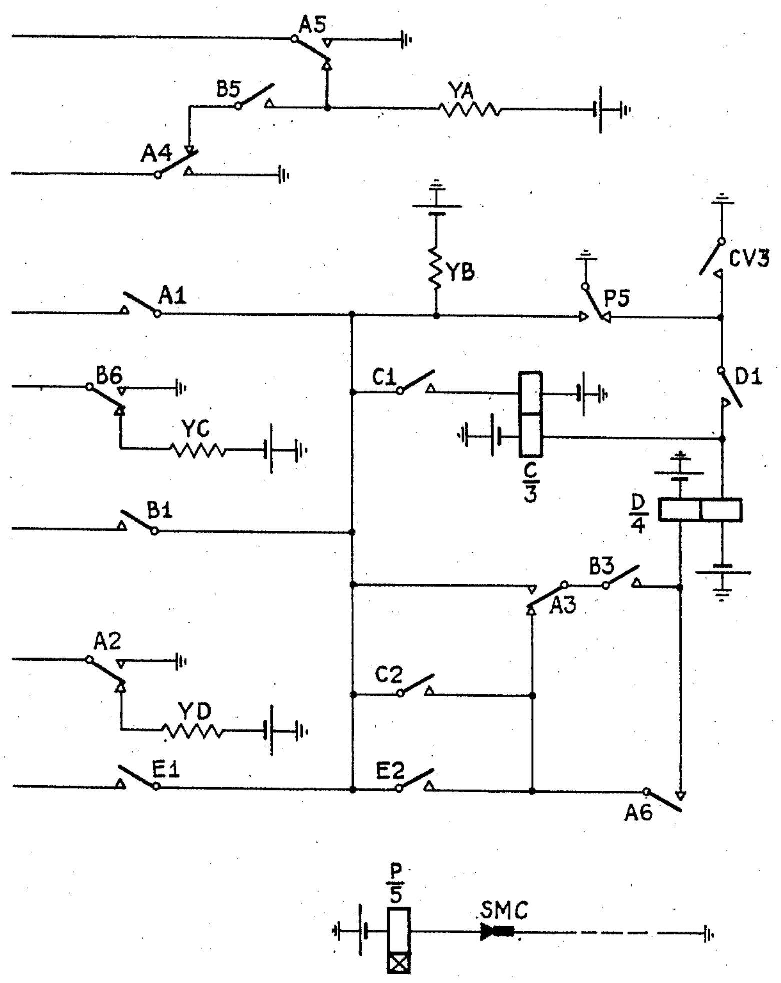
Figure 7:
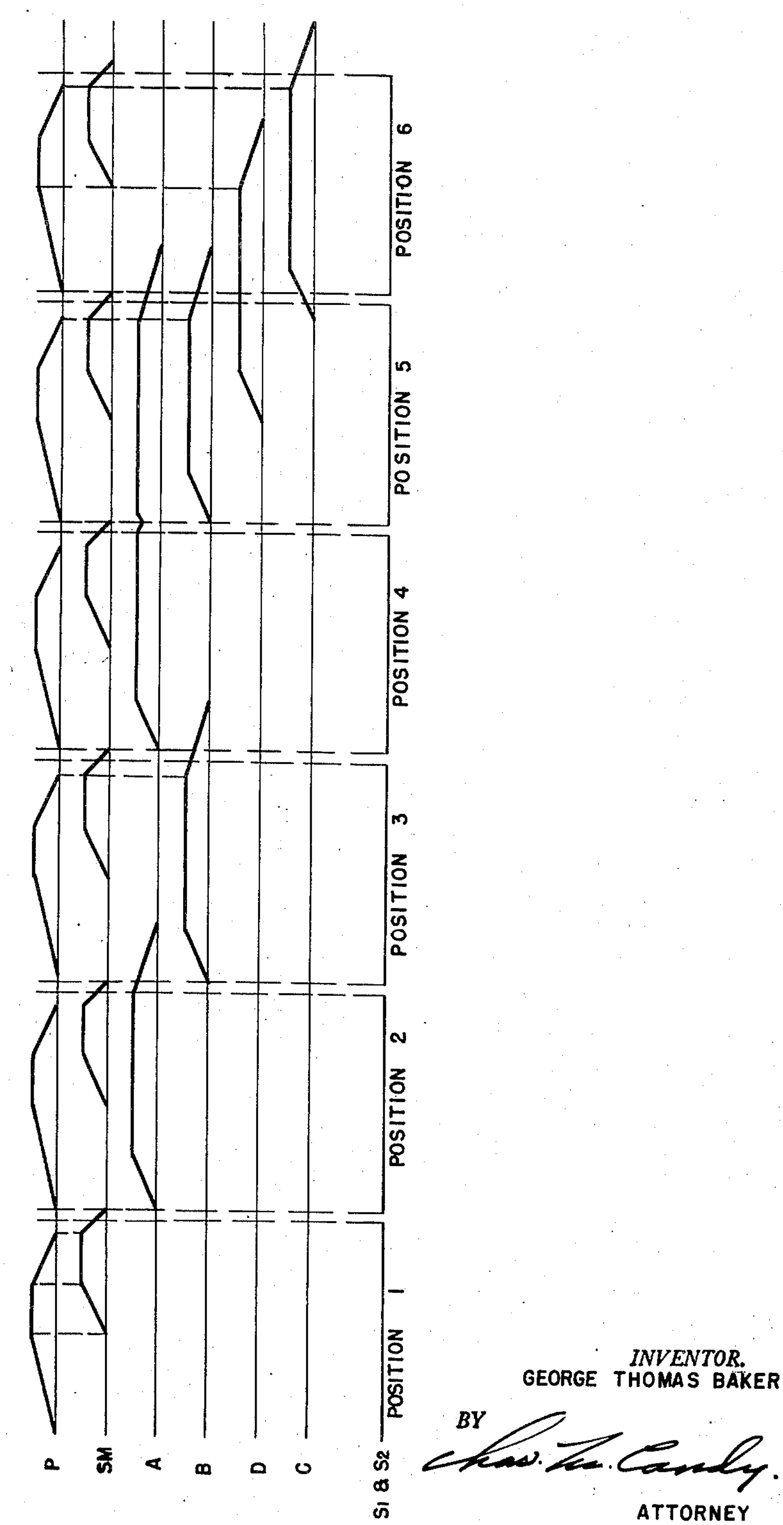

The invention will be better understood from the following description of various ways of carrying it into effect which should be taken in conjunction with the accompanying drawings comprising Figs. 1 to 7. Of these Fig. 1 shows the method of control preferably used for each individual relay, Fig. 2 shows schematically the basic circuit used for addition and subtraction, Fig. 3 shows a circuit which will give simple multiplication, while Figs. 4 and 5 show a slightly more complicated arrangement adapted to give simple addition in the decimal scale utilising the principles of the invention, Fig. 6 indicates the code employed, and Fig. 7 shows a timing and sequence chart for Fig. 2.

Referring first to Fig. 1, it will be appreciated that each sum relay such as UR has one terminal connected to one pole of the operating source, represented as earth, possibly by way of suitable contacts which give general control, while the other terminal is connected to lead A to which either the other pole of the source, which will be referred to as battery, or earth may be connected according to requirements. If the relay is unoperated and battery is connected up at A, it then operates and completes a locking circuit for itself by way of resistor YA and control contacts SR1 so that it remains operated if the initiating battery is subsequently removed. If battery is then again connected up at A, no change will be produced but if earth is connected up, the relay is shunted and accordingly releases. It will be appreciated that the relay is used as a form of storage device and that the operated condition of the relay is characterised by the connection of battery to lead A. It will be further appreciated that a circuit like that shown in Fig. 1 is connected to each of the contacts of S2, the relays like UR in this case being called the addend relays. In all cases the digit "1" represents an operated relay and the digit "0" represents a normal relay.

Referring now to Fig. 2, where two numbers which are to be added are assumed to be set up by suitable operation of relays connected to successive contacts in the banks of the uniselector wipers S1 and S2 respectively. This operation may conveniently be done by suitable keys such as K in Fig. 1 which momentarily connect battery to the appropriate contacts and thus enable the relays to operate and lock up. Since operation of the binary scale is assumed, the relay connected to any contact represents double value of the relay connected to the preceding contact, i. e. the power of the implied radix increases by 1 for each successive contact.

The stepping of the rotary stepping switches, or so called uniselector, is caused by the interaction of relay P and the driving magnet SM and is initiated by the closing of a contact (not shown but indicated by the dotted connection) in the circuit of relay P. Relay P is slightly slow to operate and when it does so it closes its contact P1, thereupon energising the magnet SM. This opens the interrupter contacts SMC and thus releases relay P which in turn releases the magnet and the wipers are then advanced to the next contact. The action which takes place on each contact may therefore be divided into two stages. The wipers reach the contact with relay P in normal position and relays A and B are then operated over their upper windings by the locking battery if the associated sum or addend relays have been operated for the particular digit concerned. As will be pointed out later, relay C is already operated if there is a carry forward from the preceding contact. When relay P operates, the wipers S1 and S2 are disconnected from relays A and B and wiper S1 is disconnected or connected to either battery or earth depending upon the desired setting of the relay in accordance with the appropriate figure of the sum. Wiper S2 is connected to earth in every case so that if the addend relay associated with that contact is operated, it is shunted down. Consequently, after the complete operation the registration in the bank of wiper S2 is wiped out while that resulting in the bank of wiper S1 represents the sum of the two numbers originally set up on the banks of wipers S1 and S2.

In order to follow the operation a little more closely, assume first that the relays connected to the second contacts in the trunks of both wiper S1 and wiper S2 are operated and that there is no carry forward digit. Accordingly, when these contacts are reached, both relays A and B are operated and it will be appreciated that the appropriate condition for the sum is zero for that digit and a carry forward of 1. The effect of the operation of both relays A and B is that an earth connection over contacts A2 and B2 is prepared to wiper S1. When relay P operates this earth is extended to wiper S1 by contacts P3 and causes the release of the operated sum relay while earth over contacts P2 is applied to wiper S2 and causes the release of the addend relay in the B group. Moreover, relays A and B now lock up over their lower windings to earth at contacts P4 and this earth is also extended over contacts SUB, A3, C2 and B3 to operate relay D. This relay at contacts D1 prepares a locking circuit for itself and an operating circuit for relay C. It should be mentioned that the connection of battery by way of resistor YB to the locking contacts P4 is intended to give the relays A, B and C a slight release lag to cover the transit time of relay P. When relay P next releases the wipers are advanced to contact 3 so that relays A and B take up positions corresponding to the digits registered in this position. Moreover, relay C is now operated and alters the circuits in a manner which will be more fully appreciated subsequently.

Assume first that neither of relays A and B is operated in this position. In this case when relay P next operates, since contacts C4 are changed over, battery via resistor YA is connected to wiper S1 to operate the appropriate sum relay and register 1 in respect of the carry forward digit. If relay A is operated, contacts A2 will connect up earth to shunt down the operated sum relay and thus register the digit 0 while a circuit will also be completed over contacts A3 and C3 for relay D which is accordingly maintained operated after relay P energises. This state of operation is subsequently transferred to relay C which thus again registers a carry forward digit. If relay B alone is operated in position 3 of the wipers of the switch S, no potential is connected to wiper S1 so that no change is made to the condition of the sum relay, i. e. it remains de-energised. A circuit is also completed over contacts B3 and C2 for relay D so that it remains energised and subsequently energises relay C to give a carry forward digit. If both relays A and B are operated, the conditions are substantially the same as with only relay B operated except that in this case the fact that no potential is connected to wiper S1 means that the operated sum relay remains operated.

The subsequent operations which take place as the wipers of the switch S are further advanced are similar and will be followed without difficulty. As previously pointed out, the result of the addition is set up on the sum relays associated with wiper S1 while the addend relays associated with wiper S2 are all released so that a further number may then be set up and another addition operation carried out.

Fig. 7 discloses a timing and sequence chart for relays A, B, C, D, P and magnet SM. The upward slanting portion of the bars indicates the operating time of the relay associated therewith and the downward slanting portion of the bars indicates the restoring time of the associated relay. It will be noted that the bars associated with relay P have a long upward slant thus indicating the slow to operate characteristics of this relay. The magnet SM is shown as having a relatively fast restoring time as is characteristic of such magnets. Relays A, B, C and D are shown as having slow to restore characteristics due to the shunting resistor YB.

Taking now the operation of Fig. 2 in conjunction with Fig. 7 for the problem of adding 13 to 10. These decimal numbers are of course written as 1101 and 1010 in the binary system and their sum is 10111. We will assume that the sum relays associated with contacts 2, 4 and 5 of S1 corresponding to number 1101 have been operated by appropriate non-locking keys such as K in Fig. 1, and the addend relays associated with contacts 3 and 5 of S2 corresponding to number 1010 have also been operated in a similar manner. The adding process is initiated by closing the energizing circuit to relay P as has been described. Relay P is slow to operate as is shown by the timing diagram and when it operates it closes contacts P1 thereby starting the operation of motor magnet SM. Magnet SM operates opening contacts SMC which opens the energizing circuit of relay P which now starts to restore. When relay P restores contacts P1 open and motor magnet SM restores and in so doing steps S1 and S2 to position #2 as is shown in the timing diagram. This cycle of operation is repeated, stepping the switch from contact to contact until the switch is brought to its home position by any suitable well known means.

When the wipers of S1 reaches position #2 it finds battery because of the operated condition of the sum relay associated with this position consequently relay A is energized over its upper winding. The wiper of S2 finds ground at position #2 hence there is no operation of relay B. A short time after relay A energizes, relay P again energizes and locks relay A energized over its lower winding through contacts P4 and A1. Relay A connects ground at contacts A2 through B2 but because of the deenergized condition of relay C, this ground is ineffective. Thus, for this position the circuit connected to the wiper of S1 is an open circuit and there is no change in the operated condition of the sum relay associated with this position when the switch steps off of position #2, relay A starts to restore as is shown in Fig. 7. When S1 and S2 reach position #3, the wiper of S1 finds ground and the wiper of S2 finds battery. Relay B now operates over its upper winding. A short time after relay B operates, relay P operates and locks relay B energized over its lower winding through contacts P4 and B1. Relay P connects direct ground to the wiper of S2 at contacts P2 thus shunting down the operated addend relay associated with position #3. Battery is now connected through resistance YA, contacts A2, B2, C4 and P3 to the wiper of S1 thus operating the sum relay associated with position #3. As soon as relay P restores, relay B starts to restore because the wiper of S2 is no longer finding battery on position #3 since formerly operated addend relay has been shunted down. S1 and S2 now step to position #4 where the wiper of S1 finds battery and the wiper of S2 finds ground.

The operation of the various relays is the same for position #4 as it was for position #2 except that relay A remains energized when S1 steps to position #5 as is shown in Fig. 7. Relay A remains energized in this case because the wiper of S1 finds battery on both positions #4 and #5 and due to its slow to release characteristics, relay A does not have time to restore during the slight interval occurring between the time the wiper of S1 leaves position #4 and arrives at position #5. When the wiper of S2 arrives at position #5 it also finds battery hence relay B operates over its upper winding. A short time after relay B operates, relay P again operates and locks relays A and B energized over their lower windings from ground at contacts P4 through contacts A1 and B1. Ground is now extended from contacts A2 through contacts B2, C4 and P3 to the wiper of S1 to thereby shunt down the operated sum relay associated with position #5. Relay P also shunts down the operated addend relay associated with position #5 at contacts P2. Relay D operates over its upper winding from ground at contacts P4 through contacts SUB, A3, C2, B3 and upper winding of relay D to battery. Relay D prepares a locking circuit for itself and an energizing circuit for relay C at contacts D1. Since both the sum and addend relays associated with position 5 were shunted down, relays A and B will start to restore when relay P restores and opens their locking circuits at contacts P4. As soon as relay P restores, relay C operates over its upper winding through contacts P4 and D1. This circuit also locks relay D1 energized over its lower winding. When S1 and S2 reach position #6, both wipers find ground hence neither relays A or B operate but when relay P next operates, battery is extended through resistance YA, contacts A2, B2, C4 and P3 to the wiper of S1 thus operating the sum relay associated with this position to thereby register the carry over digit from position #5. Relay P also opens the locking circuit of relay D at contacts P4, relay C being locked up over its lower winding through contacts C1. Relay C restores when relay P opens contacts P4 in restoring at the end of the operating cycle for position #6. S1 and S2 will continue to step until they reach the home position but the wipers will find ground on all subsequent positions hence relays A, B, C and D will remain deenergized.

The only difference between addition and subtraction is in the carry-over digit and this requires that the carry-over relay be operated when the wiper of S2 is the only wiper to find battery on a particular position. Hence, if the changeover combination SUB shown in the dotted square in Fig. 2 is moved to the alternate position, the conditions are met and the circuit will now function to subtract number B from number A.

The case of subtraction involves a difficulty which does not arise in the case of addition, viz. where the second number is greater than the first number so that the result is negative. This difficulty, however, may be overcome in a very simple manner by providing more storage relays than are actually required. This means that all the later relays are operated if the result is negative and the fact that the last relay is operated may conveniently be used to indicate this fact. If due to a further addition the result becomes positive, the later storage relays are released and the correct result is given. In this manner the circuit can be used for mixed additions and subtractions by suitable changeover of contacts SUB even though some of the intermediate results are negative.

In order to trace the working of the circuit it will be assumed that the number 7 represented by the connection of battery to contacts 2, 3 and 4 in the bank of wiper S2 is to be subtracted from the number 4 represented by the connection of battery to contact 4 in the bank of wiper S1. It will be appreciated that 7 is 111 on the binary scale while 4 is 100. When the wipers advance to position 2, relay B only is operated with the result that when relay P operates, battery is connected to wiper S1 to operate the appropriate storage relay and since contacts SUB are now changed over, relay D is operated over contacts SUB, A3, C2 and B3. When relay P releases and the wipers advance to contact 3, relay C also is operated and again relay B but not relay A. No change is therefore made to the de-energised condition of the A storage relay in this position since no potential is connected to wiper S1 and in addition a circuit is maintained for relay D over contacts C2 and B3. When the wipers advance to position 4 both relays A and B are operated and since relay C is still operated, no change is made to the energised condition of the A storage relay and relay D is again operated. In position 5 neither relay A nor relay B is operated and hence the appropriate A storage relay is energised and a circuit is maintained for relay D over contacts A3 and C3. The same conditions apply to all subsequent positions of the switch and hence as pointed out above all the later A storage relays are operated and the last one may be used to indicate the negative result. It will be appreciated that if addition is subsequently made so as to make the result positive the conditions for the later positions will be that both relays A and C are operated which results in connection of earth to wiper S1 and the restoration of the various operated A storage relays.

Fig. 3 shows the basic circuit of Fig. 2 adapted for use in multiplying binary numbers by the repeated addition method. The main difference between Figs. 2 and 3 is the addition of a second uniselector in the circuit of Fig. 3. The numbers whose product is desired are connected to the banks of wipers SA2 and SB1 in a manner similar to the way in which numbers were set up in the case of addition. The number associated with SA2 is called the multiplier factor and the number associated with SB1 is called the multiplicand factor. The product is given at the bank of SA1.

In order that the method of operation may be readily appreciated, it will be assumed that the number 37 is to be multiplied by, say 17. 37 is 32+4+1, or written in the binary scale 100101 and hence when this number is set up operated relays will be connected to the 1st, 3rd and 6th contacts in the bank of wiper SA2. 17 is 16+1, or written in the binary scale 10001, so that operated relays will be connected to the second and sixth contacts in the bank of wiper SB1 when this number is set up, the home position being counted as the first position. In order to start the operation earth is connected to the interrupter contacts SAMC and SBMC. Since an energised storage relay is connected to the first contact engaged by wiper SA2, relay SW is operated and on the operation of relay P relay SW is locked up and circuits are completed for the magnets SAM and SBM of the two uniselectors. They then open their interrupter contacts SAMC and SBMC and release relay P whereupon the magnets are de-energised and the two switches step together. Relay P also at contacts P2 by connecting earth to wiper SA2 shunts down the operated storage relay. On the second contact of switch SB, relay ON is energised over wiper SB2 and at contacts ON2 disconnects wiper SA2 so that the conditions encountered by this wiper exercise no further control during this cycle. The operations which take place at this time are exactly the same as the arrangement of Fig. 2 and since nothing has yet been set up on the bank of wiper SA1, the effect is that the number registered on the bank of wiper SB1 is transferred to SA1, or in general terms the number set up on SB1 is multiplied by 1 and added to the number set up on SA1. When the uniselectors reach the home position, relay ON releases and at contacts ON1 opens the stepping circuit for the B uniselector since relay SW is now normal. Uniselector SA however continues to step since the circuit of relay P is still maintained. When the third contact is reached, relay SW is again operated and thus initiates the stepping of the uniselector SB. Relay ON is operated as soon as this switch moves off-normal and prevents wiper SA2 exerting any further control over this cycle. The two uniselectors now continue to step together but this time wiper SA1 is two contacts in front of wiper SB1. Hence during the subsequent process the operated relay representing 1 connected to the second contact engaged by wiper SB1 is added to SA1 as a 4 and the operated relay representing 16 connected to contact 6 is added as 64. Thus the number set up on SB1 is multiplied by 4 and added to SA1. When uniselector SB reaches its home position by which time uniselector SA will be in position 3, relay ON releases and uniselector SA continues to step until it reaches the sixth contact. Relay SW then operates and causes uniselector SB to step as previously described. Uniselector SA is now five contacts in front of uniselector SB and the effect therefore is that the number on SB1 is multiplied by 32 and added to SA1. The total registered on SA1 is now 37 times the number on SB1 and since all the relays connected to SA2 have now been released, the operation ceases assuming that control is by a pilot relay in their locking circuit. It will of course be understood that there will be sufficient contacts in the switch banks that with the maximum displacement between the two switches switch B will pass the highest digit place before switch A reaches its home position. It will be appreciated that the operated relays connected to SB1 can now be released by the opening of their locking circuit in order to permit the setting up of a further number to be dealt with.

For the purpose of examining the circuits of Fig. 3 more closely let us take the example of multiplying 4 times 5 which, when written in binary notation, appears as 100×101. The product of course, is 10100. Assume now that the number 100 has been set up on the banks of SA2 in which case battery is connected to the third contact. Assuming also that the number 101 has been set up on the banks of SB1 in which case battery is connected to the second and fourth contacts the home position in all cases being counted as the first position. No operation takes place until a circuit is completed for relay P through contacts SAMC by the operation of any suitable switching device (not shown but indicated by the dotted connection). Relay P operates and completes a circuit for motor magnet SAM at contacts P4 thereby causing magnet SAM to energize and open contacts SAMC. Relay P restores opening contacts P4 thereby causing magnet SAM to restore and step SA1 and SA2 to position #2. Ground is found by the wipers of both SA1 and SA2 hence there is no relay operation on this position. Relay P and magnet SAM continue their cyclic operation as has been previously explained in conjunction with Fig. 2. Upon the next deenergization of magnet SAM, the wipers SA1 and SA2 step to position #3. Battery is found on position #3 by the wiper of SA2 and is extended through contacts ON2, P2, and the upper winding of relay SW to ground. Relay SW operates, preparing an energizing circuit for motor magnet SBM at contacts SW2, and preparing a locking circuit at contacts SW1.

Relay P now operates and completes the locking circuit for relay SW by way of contacts P5, SW1 and the lower winding of relay SW. Relay P connects direct ground to the wiper of SA2 at contacts P2 through contacts ON2 thus shunting down the operated multiplier relay (not shown but like the sum relay shown in Fig. 1) associated with position #3. Relay P also completes the energizing circuit for motor magnet SBM at contacts P1. The two motor magnets now operate in synchronism to step their respective switches from contact to contact under the control of relay P. It will be appreciated that the wipers of SA1 and SA2 are now two steps ahead of the wipers of SB1 and SB2 i. e.—when the switches next step, the wipers of SA1 and SA2 will be on position #4 while the wipers of SB1 and SB2 are on position #2. Relay ON now operates in an obvious manner and at contacts ON2 opens the energizing circuit of relay SW and rendering the wipers of SA2 ineffective during the subsequent positions of the switch. Relay ON also completes a new energizing circuit for magnet SBM, relay SW having restored. The wiper of SB1 finds battery on position #2 hence relay B operates over an obvious circuit. When relay P is next operated battery is extended through resistance YA, contacts A2, B2, C4 and P3 to the wiper of SA1 to thereby operate the product relay (not shown but like the sum relay shown in Fig. 1 associated with position #4. Up to this point, the product relays have registered 0 on positions #2 and 3, and 1 on position #4. On the next step of the switches all the wipers find ground so that no relay operation takes place on this position. On the next step however, position #6 for SA1 and SA2 and position #4 for SB1 and SB2, the wiper of SB1 again finds battery thus causing relay B to operate. When relay P next operates, battery is again connected to the wiper of SA1 to thereby operate the product relay associated with position #6. All subsequent positions of the switches are grounded hence no further relay operation will take place and the switches will be returned to their home positions. It will be appreciated that the product relays associated with SA1 have been operated on the fourth and sixth positions thereby indicating the number 10100 which of course is the product of 100 and 101.

It will be seen on consideration that fractions can be handled without difficulty provided what may be termed the binary point (equivalent to the decimal point in the ordinary denary scale) is located in the same position for banks SA2 and SB1 and that suitable care is taken in interpreting the result.

Figs. 4 and 5 show the same general principles applied to computation directly in the scale of 10 using the code indicated in Fig. 6. This employs four units, referred to as W, X, Y, Z which are associated with successive positions of the uniselector wipers and in this case four banks are necessary. The circuit operations are not quite so easy to follow and can best be illustrated by means of an example.

It will be assumed that 651 and 279 are to be added so that by the operation of suitable keys 651 is set up on the relays connected to the bank of wiper S1 and 279 on the relays connected to the bank of wiper S2. From consideration of the code shown in the table, Fig. 6, it will then be seen that battery is connected to contacts 1, 6, 8, 12 and 13 in the bank of wiper S1 and to contacts 1, 4, 6, 7, 8 and 12 in the bank of wiper S2. When the registrations have been duly made, relays A and B will be operated and it is assumed that at the same time the circuit of relay P is closed. When relay P operates, relays A and B lock up in the usual manner, the battery connection through resistor YB ensuring the necessary slight release lag. Contacts P1 then energise the magnet SM while contacts P5 complete a circuit over contacts A3 and B3 for relay D which operates and prepares a circuit for relay C. Contacts B4 and A5 serve for the connection of earth to wiper S1 so that the operated units W storage relay is released while earth is connected over contacts CV1 to wiper S2 to de-energise the operated W storage relay in the group UB. When relay P releases, the wipers are advanced to the next position and relay C is operated and relay D held energised.

In position 2 neither wiper S1 nor wiper S2 picks up battery so that relays A and B are now released. When relay P energises relay C alone remains energised and hence battery is connected to wiper S1 to operate the X storage relay. When relay P de-energises, relay C also releases and the wipers are advanced to position 3 in which again neither relay A nor relay B is operated. Hence when relay P operates, no connection is made to wiper S1 and the Y storage relay is not operated. When position 4 is reached relay B alone is operated and hence when relay P energises, battery is applied over contacts A5, C3, B4, CV2 and P4 to energise the Z relay in the units combination UA.

In position 5 relay A is operated by the Z storage relay just energised and relay B is operated by the Y storage relay energised in position 2. In addition relay CV is operated over wiper S4 and changes over the circuits for wipers S1 and S2. When relay P operates, relay D is energised over contacts P5 and relay C is then energised over contacts CV3 and D1. As a result earth is applied over contacts A4, D4 and CV2 to de-energise the operated Z storage relay and similarly earth is applied over contacts B6, D3 and CV1 to de-energise the operated X storage relay. No connection can be made to wiper S3 owing to the operation of contacts B2. The result is therefore that in the units group UA there is now no storage relay operated which corresponds to the digit 0.

When relay P de-energises and the wipers are stepped to position 6, relays A and B are both maintained operated while relay CV releases but relays C and D remain operated. Consequently when relay P again energises, no potential is connected to wiper S1 and the operated W storage relay remains operated and also relay D remains energised over contacts A3 and B3. When relay P releases and the wipers move to position 7, relays C and D are still energised and also relay B but relay A now falls away. On the operation of relay P in position 7 therefore, again no potential is connected to wiper S1 and hence the X storage relay remains de-energised. Relays C and D are still maintained energised, the latter over contacts C2, A3 and B3. In position 8, relays A and B are again both operated so that on the operation of relay P, relays C and D still remain energised and no connection is made to wiper S1 so that the Y storage relay remains energised. When position 9 is reached, relays C and D are operated but neither relay A nor relay B. Hence when relay P operates, relay D releases and battery is connected to wiper S1 to operate the Z storage relay.

When the wipers step to position 10, relay C releases and relay CV is operated. Moreover in this position relay A is operated from the Z storage relay just energised but relay B is not operated and the operated Y storage relay energises relay E. On the next operation of relay P, relay D is operated over contacts E2 and A6 and also relay C and the following conditions are set up: earth is connected to wiper S1 over contacts A4, D4, CV2 and P4 to release the Z storage relay; battery is connected to wiper S2 over contacts B6, D3, CV1 and P3 to operate the X storage relay; earth is connected to wiper S3 over contacts A2, D2, P2 and B2 to release the operated Y storage relay. Consequently the final set up of the tens storage relays TA is that relays W and X are operated corresponding to the digit 3.

When relay P next de-energises and the wipers are advanced to position 11, relays A, B, CV and E release but relays C and D are held up. When relay P again operates therefore, relay D releases and battery is connected to wiper S1 to operate the hundreds W storage relay. When relay P next de-energises and the wipers step to position 12, relays A and B are operated and relay C releases. On the next operation of relay P, relay D is energised and the conditions are therefore that earth is connected to wiper S1 so that the X storage relay is de-energised. On the next de-energisation of relay P it causes the advance of the wipers to position 13 and relays C and D are energised and relay A is energised but not relay B. On the operation of relay P in this position therefore, relay D is held energised over contacts C2 and A6 and earth is connected to wiper S1 and accordingly the hundreds Y storage relay is de-energised. On the next release of relay P whereupon the wipers are stepped to position 14, relays C and D remain energised but neither relay A nor relay B is operated in this position. Accordingly, relay D releases when relay P again energises but owing to the continued operation of relay C, battery is connected to wiper S1 so that the Z storage relay is energised.

The next release of relay P, which causes the wipers to advance to position 15, effects the release of relay C and relay A is now operated from the Z storage relay just energised and relay CV is operated as usual. Since neither the X storage relay nor the Y storage relay is operated, no circuit is completed for either relay B or relay E. Consequently when relay P next operates there is no circuit for relay D and in view of the changeover of the CV contacts, no potential can be connected to any of the wipers S1, S2 and S3. Hence the set-up in the hundreds storage group HA is relays W and Z corresponding to the digit 9. On the next de-energisation of relay P, the wipers are advanced to position 16 and relay CV de-energises but as relays A, B and C are all now de-energised no connection can be made to wiper S1 to operate the W storage relay assuming that a further set is provided. This applies equally to each position during the subsequent stepping of the switch back to its home position.

In order to enable the working of the circuit to be more fully appreciated one other example will be traced through in some detail and for this purpose it will be assumed that the number set up on the B storage relays is 479 instead of 279 so that battery is connected to contact 13 engaged by wiper S2 instead of contact 12 and the total should be 1130 instead of 930. The operation of adding the first two digits is therefore the same as previously described and conditions are also the same in position 11 in which relay C only remains operated and the hundreds W storage relay is operated.

On the next de-energisation of relay P it causes the wipers to step to position 12, relay C also is released and in this case only relay A is operated. Consequently no potential is connected to wiper S1 on the subsequent operation of relay P and hence the X storage relay remains operated. When relay P de-energises, the wipers are advanced to position 13 and both relays A and B are now operated. Hence when relay P again operates, relay D is energised and earth is connected to wiper S1 to cause the release of the Y storage relay. On the next release of relay P, it brings the wipers to position 14, relays C and D are energised but neither relay A nor relay B. Hence when relay P operates, battery is connected to wiper S1 to operate the Z storage relay and relay D releases.

When relay P next releases and the wipers are advanced to position 15, relay CV is operated and also relays A and B in view of the operated condition of the X and Z storage relays while relay C is released. On the next operation of relay P, relay D is again energised and energises relay C over contacts CV3 and hence earth is connected to wiper S1 to release the Z storage relay and earth is connected to wiper S2 to release the X storage relay but owing to the operation of contacts B2, earth cannot be connected to wiper S3 though in this particular instance it would have no effect as the Y storage relay is not operated. Accordingly the final set-up of the hundreds storage group HA is that relay W is energised corresponding to the digit 1.

When relay P next de-energises, the wipers are stepped to contact 16 and relays C and D remain energised. Since however nothing is now set up on either the A or the B thousands storage groups assumed to be provided neither relay A nor relay B is operated and hence on the operation of relay P, battery is connected to wiper S1 to operate the thousands W storage relay. Relay D now releases and consequently when relay P releases, relay C also falls away and in position 17 no connection is made to wiper S1. This is also true of positions 18 and 19 and in position 20 no change can be brought about since none of the X, Y and Z storage relays is operated. Accordingly the final result is that in both the hundreds and the thousands storage groups the storage relay W is energised representing the digit 1, and the correct answer 1130 is given.

I claim:

1. In a calculator, a rotary stepping switch having first and second banks of contacts and a wiper for each bank, a first group of relays connected to successive contacts in said first bank of contacts, a second group of relays connected to successive contacts in said second bank of contacts, means for operating certain of the relays in each of said groups of relays to thereby register a number on each of said groups of relays, a set of common relays associated with the wipers of said switch, means for causing the wipers of said switch to progressively engage successive contacts on said switch, an electrical circuit connected to each of said wipers for controlling the operations of said common relays in accordance with the registrations on said groups of relays during said progressive engagement of said successive contacts, and circuits controlled by the operations of said common relays for registering a different number on one of said groups of relays.

2. In a calculator, a rotary stepping switch having wipers and banks of contacts accessible thereto, a group of relays connected to successive contacts in one bank of said switch, means for causing said relays to register a number in the binary scale, a second group of relays connected to successive contacts in a second bank of said switch, means for causing said second group of relays to register a second number in the binary scale, a set of common relays associated with the wipers of said switch, means for transferring the registrations of individual relays of said groups of relays connected to a particular position of said switch to said common relays, means controlled by said common relays for causing the relay in said first group of relays associated with said particular position of said switch to register the appropriate digit representing the algebraic sum of the original registrations at said particular position.

3. A calculator as is claimed in claim 2 including means for causing the relay in said second group of relays associated with said particular position of said switch to register zero.

4. In an electric calculator, a rotary stepping switch having wipers and banks of contacts accessible thereto, a group of relays connected to successive contacts in one bank of said switch, a second group of relays connected to successive contacts in a second bank of said switch, means for causing said second group of relays to register a number in the binary scale, a second rotary switch having wipers and banks of contacts accessible thereto, a third group of relays connected to successive contacts in a bank of said second switch, means for causing said third group of relays to register a number in the binary scale, stepping means for causing the wipers of said first switch to advance through successive complete operating cycles, means including other stepping means and relays controlled by said first switch for causing said second switch to rotate through one operating cycle for each binary digit, one registered by said second group of relays, and circuit means including common relays controlled by both of said switches responsive to the rotation of said switches for causing said first group of relays to register a number in the binary scale equal to the product of said first two numbers.

5. In an electric calculator, a first rotary stepping switch having a first wiper and a first bank of contacts, a group of relays connected to successive contacts in the bank of said first switch, means for causing certain of said group of relays to be operated to thereby register a number in the binary scale, a second rotary stepping switch having a second wiper and a second bank of contacts, a second group of relays connected to successive contacts in the second bank of said second switch, means for causing said second group of relays to register a second number in the binary scale, means for causing the wipers of said switches to advance through successive operating cycles, each of said wipers successively engaging all of the contacts in the bank with which it is associated during the time of one operating cycle, means for causing the wiper of said second switch to be displaced relative to the wiper of said first switch during each operating cycle in which the wiper of said first switch does not find an operated one of said first group of relays on the first contact which the wiper of said first switch encounters, the amount of said displacement being equal to the number of successive contacts engaged by the wiper of said first switch having unoperated ones of said first group of relays connected thereto, before it engages a contact connected to an operated relay.

6. An electric calculator as claimed in claim 5 in which said first switch includes a second bank of contacts and a wiper therefore, a third group of relays connected to successive contacts in the second bank of said first switch, a set of common relays associated with the wipers of said switches, and circuit means including said common relays responsive to the operation of said switches and in accordance with the operated condition of said first and second groups of relays for causing said third group of relays to register a number in the binary scale equal to the binary product of said first two numbers.

7. In a calculator, a rotary stepping switch having first and second banks of contacts and a wiper for each bank, a group of relays connected to said first bank of contacts, a second group of relays connected to said second bank of contacts, means for causing said first group of relays to register a first number, means for causing said second group of relays to register a second number, an augend relay associated with the wiper of said first bank of contacts, an addend relay associated with the wiper of said second bank of contacts, a carryover relay, a control circuit including contacts of said augend, addend, and carryover relays, means for causing said switch to progressively step said wipers across successive contacts in said banks of contacts, circuit means including said wipers for selectively operating said augend, addend and carryover relays in accordance with the said registrations on said groups of relays during said stepping operations, said control circuit completed by the selective operation of said augend, addend and carryover relays causing said first group of relays to register a number equal to the algebraic sum of said first and second numbers.

8. In an electrical calculating system, a switch having a wiper and a set of contacts accessible thereto, a group of relays connected to successive contacts in said set of contacts, means for operating certain ones of said group of relays to thereby mark certain of the contacts in said set of contacts in accordance with a binary number, a second switch having a wiper and a set of contacts accessible thereto, means for causing the wiper of said first switch to advance through successive operating cycles, means for causing the wiper of said second switch to advance through successive operating cycles, each of said wipers successively engaging all of the contacts in the set of contacts with which it is associated during the time of one operating cycle, a control relay connected to the wiper of said second switch, circuit means connected to the wiper of said first switch through contacts on said control relay for rendering said third means inoperative until the wiper of said first switch first finds a marked contact, said circuit means effective to deenergize the relay connected to the first marked contact found by the wiper of said first switch during each operating cycle, said control relay operative to disconnect said circuit means from the wiper of said first switch during the part of each operating cycle remaining after the wiper of said first switch first finds a marked contact to thereby prevent said circuit means from deenergizing more than one relay in said group of relays during each operating cycle of said first switch.

9. In a calculating system, a switch having a pair of wipers and a set of contacts accessible to each, a set of control relays, means for marking the contacts accessible to one wiper in accordance with a particular number, means for marking the contacts of the other set in accordance with another number, means for causing the wipers to traverse said contacts successively, circuits including said wipers for operating said control relays in accordance with the markings of both sets of contacts, and further circuits completed by said control relays to make a computation and to change the markings on one of said sets of contacts in accordance with said computation.

10. In a calculating system, a series of storage relays, a second series of storage relays, means for registering a number in the binary scale on said first series of relays by operating certain ones thereof and for registering a second number in the binary scale on the second series of relays by operating certain ones thereof, a common group of relays, means for successively associating the common group of relays with individual, corresponding relays of the first and second series, circuits interconnecting said common relays and said successively associated relays for selectively operating said common relays, and further circuits responsive to the operated common relays for causing a change in the setting of the successive relays in the first series to thereby register therein the sum of the numbers first registered in said series of relays.

11. In an electric calculating system a pair of switches each having a wiper and a bank of contacts, the contacts of one bank marked in accordance with a number used as a multiplier and the other bank marked in accordance with a number used as the multiplicand, means for causing movement of one wiper over said one bank until it finds a marked contact and then causing movement of the other wiper over the other bank while preventing any influence by other markings on the first bank, means for thereafter permitting subsequent operations of said one wiper to find successive markings on the first bank and for thereupon causing repeated rotations of the other wiper over its bank, whereby the product of the numbers may be obtained.

12. In an electrical calculating system, a rotary switch having a pair of wipers and contacts accessible thereto, a series of relays associated with the contacts accessible to one wiper operated to mark their contacts in accordance with a series of digits, a second series of relays associated with the contacts accessible to the other wiper operated to mark their contacts in accordance with another series of digits, other relays each controlled over each wiper in accordance with the marking on its contacts, a common relay controlled jointly by said other relays to register carryovers, a circuit including said one wiper and its contacts controlled jointly by said other relays and said common relay, means for rotating said wipers to engage their successive contacts, means for operating said other relays and said common relay at times during the rotation of said wipers for controlling said circuit, said circuit thereby controlling the series of relays accessible to said one wiper for changing the marking on their associated contacts to correspond to the sum of the two registered series of digits.

13. A calculator as claimed in claim 12 wherein said first and second series of relays each comprise a plurality of groups of relays, and in which the marking of a plurality of the contacts in each bank by the first group of relays in each of said series associated therewith determines the digit of the units order registered therein, while the marking on a plurality of subsequent contacts in said banks by another group of said relays in each of said series of relays associated therewith determines the digit of the next order registered therein.

14. A calculator as claimed in claim 1 in which said first and second groups of relays are divided into sets of four relays each, the operation or non-operation of the relays of each set of relays registering any decimal digit, the operation of certain ones of the relays in each of said groups of relays resulting in the registration of a decimal number on each of said groups of relays, said different number being equal to the sum of said decimal numbers.

15. In a calculating system, a first group of relays; a first group of bank contacts; means for operating said first group of relays in accordance with any digit; means controlled by the operation of said first group of relays for marking only one of said bank contacts but different ones in said first group for four different digits, for marking only two of said bank contacts in said first group but in different combinations for four other different digits, and for marking only three of said bank contacts in said first group for a further digit; a second group of relays, a second group of bank contacts; means for operating said second group of relays in accordance with any digit; means controlled by the operation of said second group of relays for marking only one of said bank contacts but different ones in said second group for four different digits, for marking only two of said bank contacts in said second group but in different combinations for four other different digits, and for marking only three of said bank contacts in said second group for a further digit; a first wiper having access to said first group of contacts; a second wiper having access to said second group of contacts; and means for simultaneously stepping said first and second wipers to successively engage their respective bank contacts in said first and second groups; and circuit means including relays controlled over said wipers in accordance with said marked contacts in said first and second groups during said stepping operation of said wipers over said first and second bank groups for adding the sum of the digits marked in said first and second groups of bank contacts.

16. A calculator as claimed in claim 15 including a third group of bank contacts, a third wiper having access to said third group of contacts, a circuit connecting certain of said first group of relays to a predetermined contact of said third group of bank contacts to mark said third bank of contacts, a circuit connecting certain other relays of said first group of relays to a predetermined contact of said second group of bank contacts to further mark said second group of bank contacts, said wiper stepping means stepping said third wiper simultaneously with said first and second wipers to cause said third wiper to successively engage its respective bank contacts, and circuit means including relays controlled over said second and third wipers in accordance with said marked contacts in said second and third groups during said stepping operation of said second and third wipers over said second and third groups of bank contacts for marking carryovers.

17. A calculator as claimed in claim 15 wherein said last circuit means is effective for causing the operation of said first group of relays to register said sum.

18. In a calculator system, a first group of relays, a first plurality of bank contacts associated with said first group of relays, means for operating said first group of relays to mark certain ones of said first plurality of bank contacts in code to designate a digit, a second group of relays, a second plurality of bank contacts associated with said second group of relays, means for operating said second group of relays to mark certain ones of said second plurality of bank contacts in code to designate a digit, a pair of wipers having access to said first and second bank contacts, means for operating said wipers causing said wipers to simultaneously engage their respective said first and second bank contacts seriatim, and means effective responsive to the stepping operation of said wipers over their said respective bank contacts for adding the sum of the digits marked in code in said bank contacts.

19. A calculator as claimed in claim 18 wherein said last means is effective for causing said first group of relays to register said sum.

GEORGE THOMAS BAKER.

REFERENCES CITED

The following references are of record in the file of this patent:

UNITED STATES PATENTS

| Number | Name | Date |
|---|---|---|
| 2,260,827 | Booker | Oct. 28, 1941 |
| 2,318,591 | Couffignal | May 11, 1943 |
| 2,346,616 | Saxby | Apr. 11, 1944 |
| 2,386,481 | Lang | Oct. 9, 1945 |
| 2,411,540 | Haigh | Nov. 26, 1946 |
| 2,444,042 | Hartley et al. | June 29, 1948 |